(12) United States Patent
Ferrere, Jr. et al.

(10) Patent No.: US 11,906,184 B2
(45) Date of Patent: Feb. 20, 2024

(54) EXHAUST FANS FOR HVAC SYSTEM WITH ENERGY RECOVERY WHEEL

(71) Applicant: Johnson Controls Tyco IP Holdings LLP, Milwaukee, WI (US)

(72) Inventors: Marcel P. Ferrere, Jr., Dalmatia, PA (US); Rajiv K. Karkhanis, York, PA (US); Aron M. Seiler, Freeland, MD (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/894,908

(22) Filed: Aug. 24, 2022

(65) Prior Publication Data

US 2023/0054511 A1 Feb. 23, 2023

Related U.S. Application Data

(63) Continuation of application No. 16/595,150, filed on Oct. 7, 2019, now Pat. No. 11,428,428.

(60) Provisional application No. 62/898,950, filed on Sep. 11, 2019.

(51) Int. Cl.

| F24F 11/46 | (2018.01) |
|---|---|
| F24F 12/00 | (2006.01) |
| F24F 11/56 | (2018.01) |
| G05B 15/02 | (2006.01) |
| F24F 11/74 | (2018.01) |
| F24F 11/63 | (2018.01) |

(52) U.S. Cl.
CPC ............... *F24F 11/46* (2018.01); *F24F 11/56* (2018.01); *F24F 11/63* (2018.01); *F24F 11/74* (2018.01); *F24F 12/00* (2013.01); *F24F 12/001* (2013.01); *G05B 15/02* (2013.01)

(58) Field of Classification Search
CPC .. F24F 11/46; F24F 11/56; F24F 11/63; F24F 11/74; F24F 12/00; F24F 12/001; F24F 2012/007; F24F 11/65; F24F 2110/10; F24F 2110/20; F24F 2110/40; F24F 2203/104; G05B 15/02; Y02B 30/56
See application file for complete search history.

(56) References Cited

U.S. PATENT DOCUMENTS

| 6,126,540 A * | 10/2000 | Janu | F24F 11/74 |
|---|---|---|---|
| | | | 454/236 |
| 7,886,986 B2 * | 2/2011 | Fischer, Jr. | F24F 3/1423 |
| | | | 62/271 |
| 7,891,573 B2 * | 2/2011 | Finkam | F24F 11/30 |
| | | | 236/1 C |
| 10,138,901 B2 * | 11/2018 | Benson | F04D 25/166 |

(Continued)

*Primary Examiner* — Ramesh B Patel
(74) *Attorney, Agent, or Firm* — Fletcher Yoder, PC

(57) ABSTRACT

A heating, ventilation, and/or air conditioning (HVAC) unit includes an energy recovery wheel, a first exhaust fan configured to draw a first air flow across the energy recovery wheel and discharge the first air flow from the HVAC unit, a second exhaust fan configured to draw a second air flow across the energy recovery wheel and discharge the second air flow from the HVAC unit, and a controller configured to operate the first exhaust fan and the second exhaust fan in an economizer mode and configured to operate the first exhaust fan and suspend operation of the second exhaust fan in an energy recovery mode.

20 Claims, 9 Drawing Sheets

(56) References Cited

U.S. PATENT DOCUMENTS

| | | | |
|---|---|---|---|
| 11,162,706 B2* | 11/2021 | Bhosale | F24F 13/08 |
| 11,428,428 B2* | 8/2022 | Ferrere, Jr. | G05B 15/02 |
| 2006/0032715 A1* | 2/2006 | Barvosa-Carter | B61G 11/12 |
| | | | 267/116 |
| 2008/0002722 A1* | 1/2008 | Greene | H04W 40/02 |
| | | | 370/400 |
| 2008/0108295 A1* | 5/2008 | Fischer | F24F 3/1423 |
| | | | 454/239 |
| 2016/0169544 A1* | 6/2016 | Fischer | F24F 3/044 |
| | | | 165/250 |
| 2017/0138612 A1* | 5/2017 | Kaiser | F24H 3/06 |
| 2017/0356661 A1* | 12/2017 | Fischer | F24F 3/153 |
| 2019/0257538 A1* | 8/2019 | Ferrere | F24F 11/46 |
| 2020/0040912 A1* | 2/2020 | Nanjappa | F24F 11/74 |
| 2020/0088439 A1* | 3/2020 | Bhosale | F24F 12/006 |

* cited by examiner

EXHAUST FANS FOR HVAC SYSTEM WITH ENERGY RECOVERY WHEEL

CROSS REFERENCE TO RELATED APPLICATIONS

This is a continuation application of U.S. patent application Ser. No. 16/595,150, entitled "EXHAUST FANS FOR HVAC SYSTEM WITH ENERGY RECOVERY WHEEL," filed Oct. 7, 2019, which claims priority from and the benefit of U.S. Provisional Application No. 62/898,950, entitled "EXHAUST FANS FOR HVAC SYSTEM WITH ENERGY RECOVERY WHEEL", filed Sep. 11, 2019, each of which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. Furthermore, the HVAC system may remove a return air flow from the environment.

In some embodiments, the HVAC system may operate in an economizer mode, in which the HVAC system discharges the return air flow removed from the environment and supplies outdoor air to the environment as supply air. The HVAC system may also operate in an energy recovery mode, in which the HVAC system utilizes all or part of the return air flow removed from the environment to pre-condition outdoor air received by the HVAC system before supplying the outdoor air to the environment as supply air. In conventional approaches, the HVAC system may include a fan configured to operate in both the economizer mode and the energy recovery mode to discharge the return air flow. Unfortunately, conventional fan systems and techniques used to operate the fan are inefficient.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) unit includes an energy recovery wheel, a first exhaust fan configured to draw a first air flow across the energy recovery wheel and discharge the first air flow from the HVAC unit, a second exhaust fan configured to draw a second air flow across the energy recovery wheel and discharge the second air flow from the HVAC unit, and a controller configured to operate the first exhaust fan and the second exhaust fan in an economizer mode and configured to operate the first exhaust fan and suspend operation of the second exhaust fan in an energy recovery mode.

In another embodiment, a control system for a heating, ventilation, and/or air conditioning (HVAC) unit, the control system including an automation controller having a tangible, non-transitory, computer-readable medium with computer-executable instructions that, when executed, are configured to cause a processor to output a first control signal in order to operate the HVAC unit in a first mode and output a second control signal in order to operate the HVAC unit in a second mode. A first exhaust fan and a second exhaust fan of the HVAC unit are in operation in the first mode, and an energy recovery wheel of the HVAC unit and the first exhaust fan are in operation in the second mode, and the second exhaust fan is not in operation in the second mode.

In another embodiment, a heating, ventilation, and/or air conditioning (HVAC) unit includes an economizer configured to draw outdoor air into the HVAC unit from an ambient environment, a plurality of exhaust fans configured to discharge return air from the HVAC unit to the ambient environment, an energy recovery wheel configured to enable heat transfer between the outdoor air and the return air and a controller. The controller is configured to operate the plurality of exhaust fans in a full economizer mode of the HVAC unit, suspend operation of a selected exhaust fan or fans of the plurality of exhaust fans in an energy recovery mode of the HVAC unit, and operate the energy recovery wheel to enable heat transfer between the outdoor air and the return air in the energy recovery mode.

DRAWINGS

Various aspects of this disclosure may be better understood upon reading the following detailed description and upon reference to the drawings in which.

DETAILED DESCRIPTION

Figure 1:
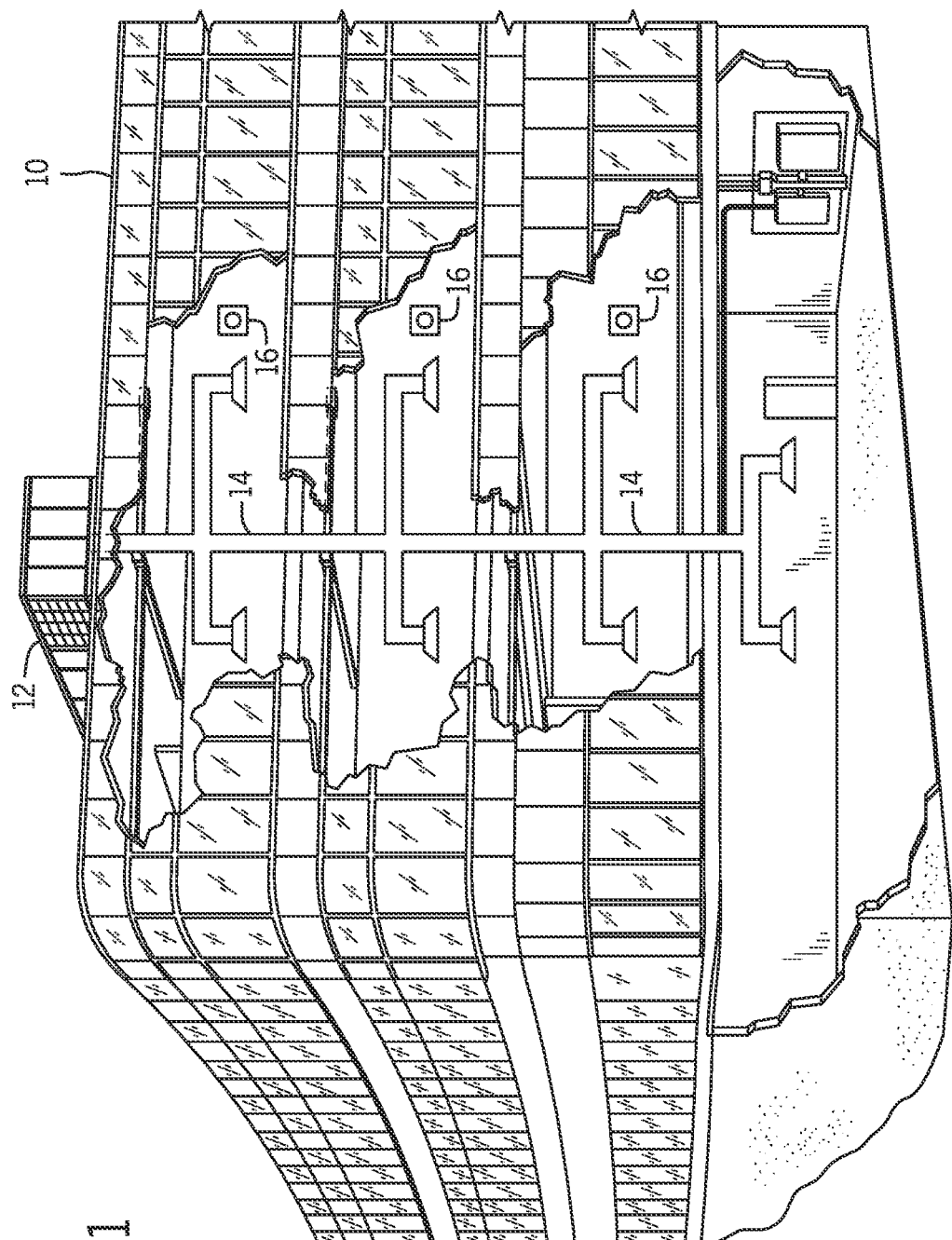
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system configured to selectively operate in an economizer mode, such as a full economizer mode, and in an energy recovery mode to condition a space within a structure. Generally, the HVAC system receives a return air flow from the space and delivers a supply air flow to the space in both the economizer mode and in the energy recovery mode. In the economizer mode, the HVAC system may receive outdoor air flow from an ambient environment to utilize as the supply air flow, and the HVAC system may supply the outdoor air to the space as the supply air flow without supplemental pre-conditioning of the outdoor air flow for use as supply air to condition the space. Furthermore, in the economizer mode, the HVAC system may discharge substantially all of the return air flow received from the space to the ambient environment. As such, the supply air flow does not include a substantial amount of the return air flow in the economizer.

In the energy recovery mode, the HVAC may also receive the outdoor air flow from the ambient environment to use for supply air flow. Additionally, in the energy recovery mode, the HVAC system may operate an energy recovery wheel to enable heat and/or moisture transfer between the outdoor air flow and the return air flow received from the space, thereby providing supplemental pre-conditioning of the outdoor air flow. The HVAC system may discharge a portion of the return air flow from the space to the ambient environment. A remaining portion of the return air flow may be used for the supply air flow along with the outdoor air flow. That is, in the energy recovery mode, the supply air flow may include a mixture of the outdoor air flow received from the ambient environment and the return air flow received from the space. In the economizer mode, a greater amount of return air flow is discharged by the HVAC system than in the energy recovery mode.

The HVAC system may include an exhaust fan configured to discharge the return air flow to the ambient environment in the economizer mode and in the energy recovery mode. The exhaust fan may operate at substantially the same operating condition in both the economizer mode and in the energy recovery mode. For example, the same operating condition may be a common exhaust fan speed or a common static pressure in an exhaust section of the HVAC system. However, operating the exhaust fan at the same operating condition may impact a performance of the exhaust fan. As an example, the operating condition in both modes may include generating substantially the same static pressure via the exhaust fan. A size of the exhaust fan may be selected to generate a particular amount of static pressure when discharging the return air flow in the economizer mode. However, operating the exhaust fan to generate the same amount of static pressure in the energy recovery mode may cause the exhaust fan to stall. For instance, there may be less return air flow available for the exhaust fan to discharge in the energy recovery mode. Thus, the exhaust fan may not direct the air flow at a desirable velocity to achieve the desired static pressure, thereby causing flow separation and disruption of air flowing through the exhaust fan to induce stall in the exhaust fan. Stalling of the exhaust fan may impact a performance of the exhaust fan, such as by creating noise, inducing unstable operation, and so forth.

Thus, it is presently recognized that discharging the return air flow without causing stall of the exhaust fan may improve operation of the HVAC system in the energy recovery mode. Accordingly, embodiments of the present disclosure are directed to an HVAC system having two or more exhaust fans that are independently controllable from one another. In the economizer mode, when a greater amount of return air flow is discharged by the HVAC system, both exhaust fans may be in operation to discharge substantially all of the return air flow received from the space to achieve the desired static pressure in the HVAC system. That is, each of the exhaust fans discharges a part of the received return air flow to discharge the return air flow at a full air flow rate. In the energy recovery mode, the operation of one of the exhaust fans may be suspended. The other exhaust fan may continue to operate and discharge a portion of the received return air flow, and the remaining portion of the received return air flow is directed to mix with an outdoor air flow to generate the supply air flow. The exhaust fan in operation may discharge the portion of the received return air flow at a sufficient velocity to achieve the desired static pressure, thereby avoiding a stall condition of the exhaust fan. For example, the exhaust fans used in the present techniques may have a different specification than the single exhaust fan used in conventional HVAC systems to enable the exhaust fans to use a lower return air flow rate to direct the return air flow at a sufficient velocity and avoid the stall condition. In this way, the exhaust fan in operation in the energy recovery mode may direct the return air flow at the partial air flow rate without stalling. Thus, the performance of the exhaust fan in the energy recovery mode is improved.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
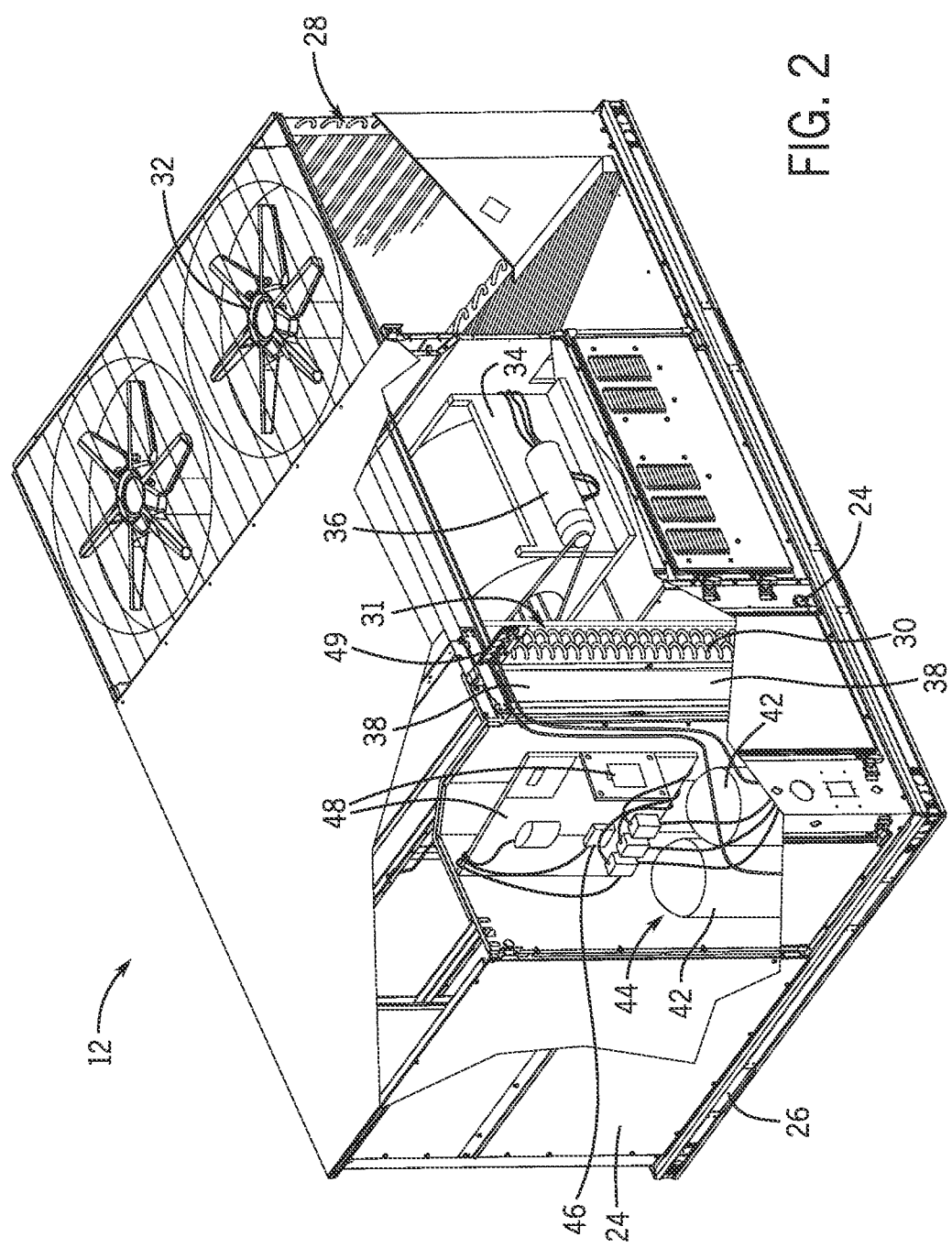
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
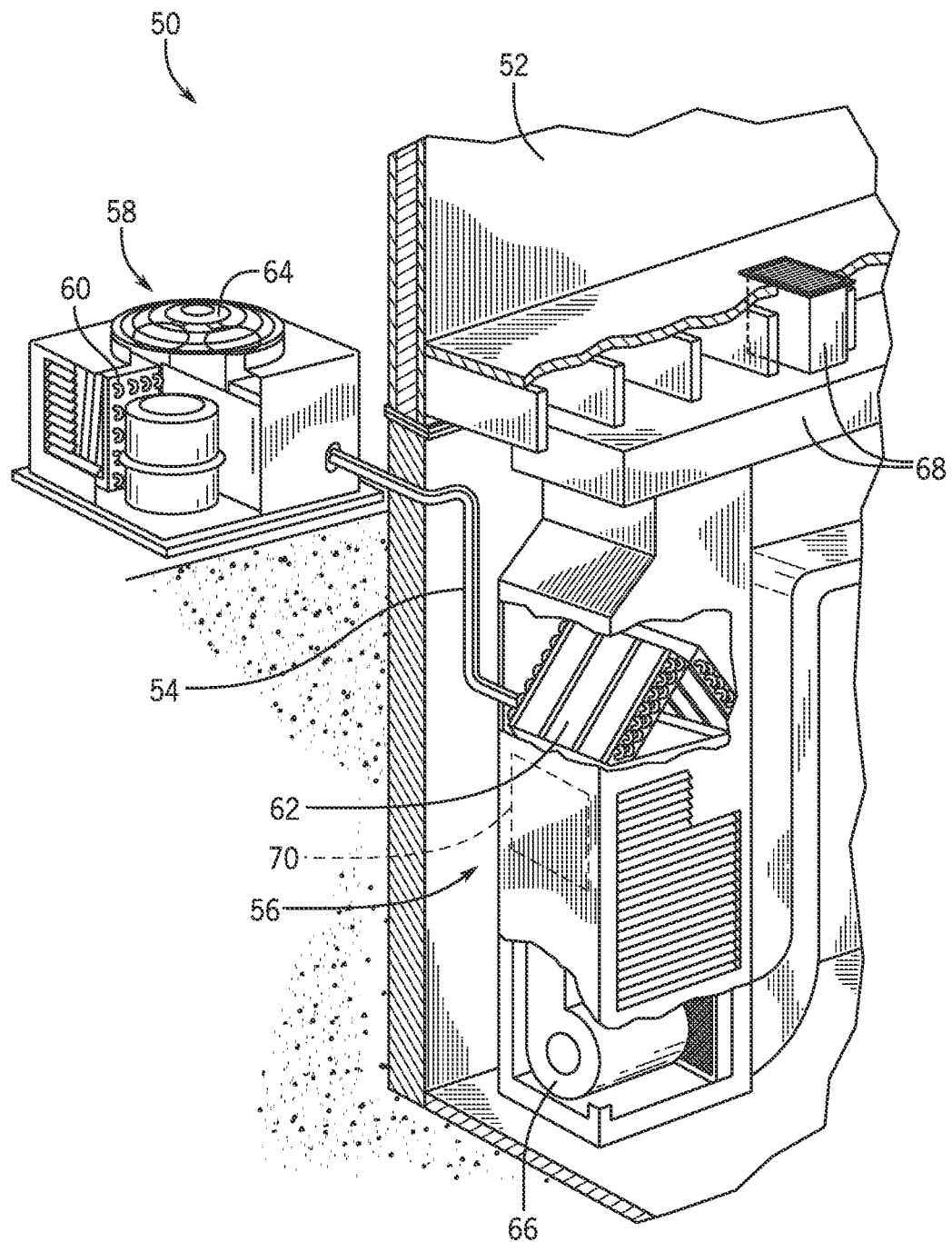
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
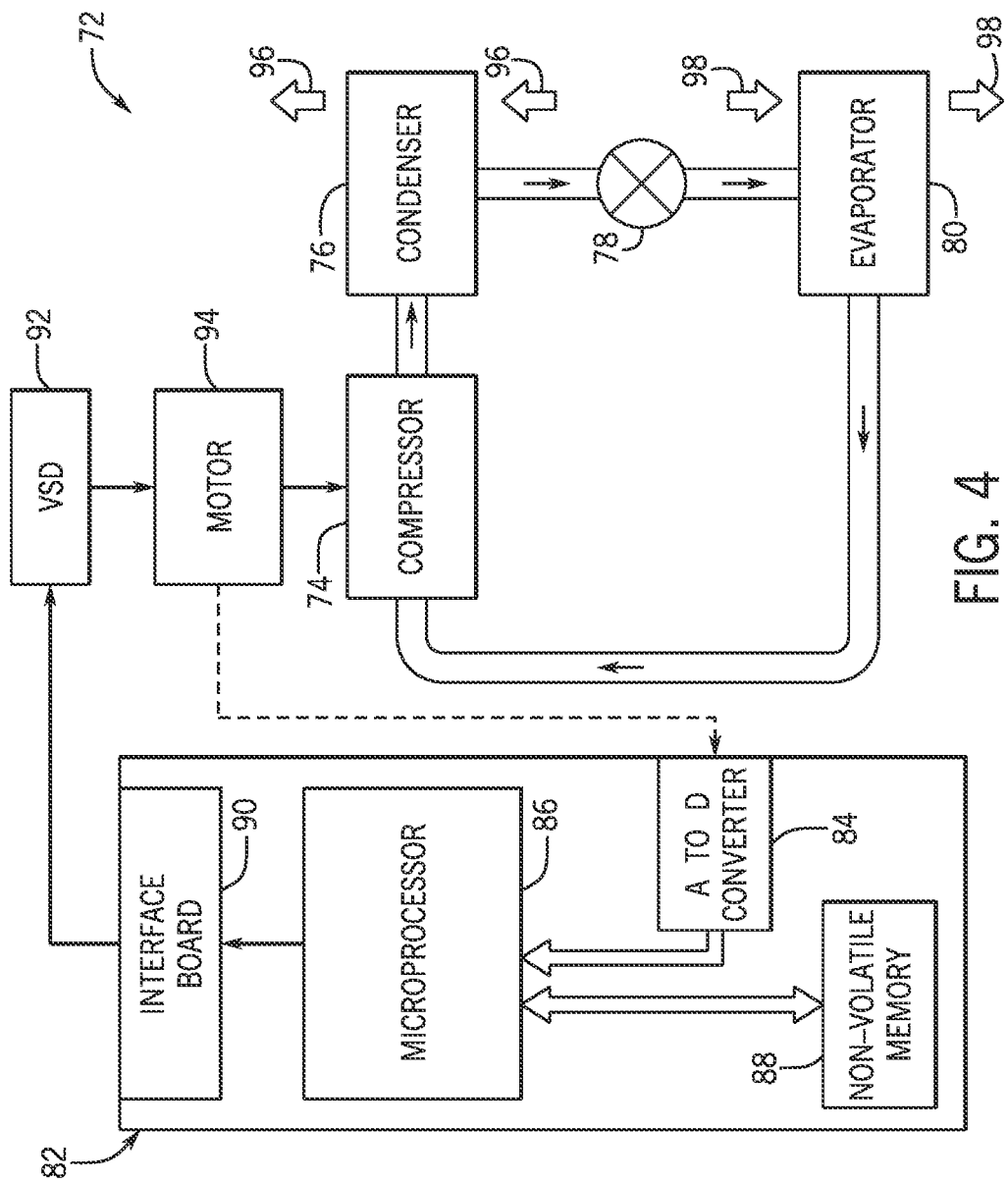
FIG. 4 is a schematic of an embodiment of a vapor compression system that can be used in any of the systems of FIGS. 1-3, in accordance with an aspect of the present disclosure, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to operate in various operating modes to draw a return air flow from a conditioned space within a structure and to deliver conditioned a supply air flow to the conditioned space. The HVAC system may include an energy recovery wheel configured to enable heat and/or moisture exchange between an outdoor air flow drawn from an ambient environment and the return air flow drawn from the space. The HVAC system may also include two or more exhaust fans configured to discharge the return air flow from the space to an ambient environment. In an economizer operating mode, the energy recovery wheel may not be in operation, and both of the exhaust fans may be operated to discharge substantially all of the return air flow to the ambient environment. In certain embodiments, the economizer mode is a "full economizer mode" whereby the supply air flow provided by the HVAC system substantially consists of the outdoor air flow and does not include a substantial amount of the return air flow. The HVAC system may use the outdoor air flow as the supply air flow, with or without further conditioning the outdoor air flow, to be delivered to the space in the full economizer operating mode. Furthermore, the operation of both of the exhaust fans in the economizer operating mode enables both of the exhaust fans to discharge the return air flow at respective velocities, such as substantially similar first velocities, to generate a desirable static pressure, thereby enabling stable operation of the exhaust fans in the economizer operating mode.

In an energy recovery operating mode, a first portion of the return air flow drawn from the space may be re-circulated and mixed with the outdoor air flow drawn from the environment. Furthermore, the HVAC system may operate the energy recovery wheel to enable heat and/or moisture exchange between a second, remaining portion of the return air flow and the outdoor air flow. As such, in the energy recovery operating mode, the outdoor air flow may be pre-conditioned by the second portion of the return air flow, and the pre-conditioned outdoor air flow may mix with the first portion of the return air flow. Thus, the supply air flow includes a mixture of the pre-conditioned outdoor air flow and the return air flow in the energy recovery operating mode. Additionally, the operation of one of the exhaust fans may be suspended such that one exhaust fan discharges the second portion of the return air flow from the HVAC system to the ambient environment. Suspending the operation of one of the exhaust fans in the energy recovery operating mode may enable the exhaust fan in operation to discharge the second portion of the return air flow at a second velocity, which may be substantially similar to the first velocity. As such, the exhaust fan may generate substantially the same static pressure in the energy recovery mode as that in the economizer operating mode, thereby enabling the exhaust fan to also operate stably in the energy recovery operating mode.

Figure 5:
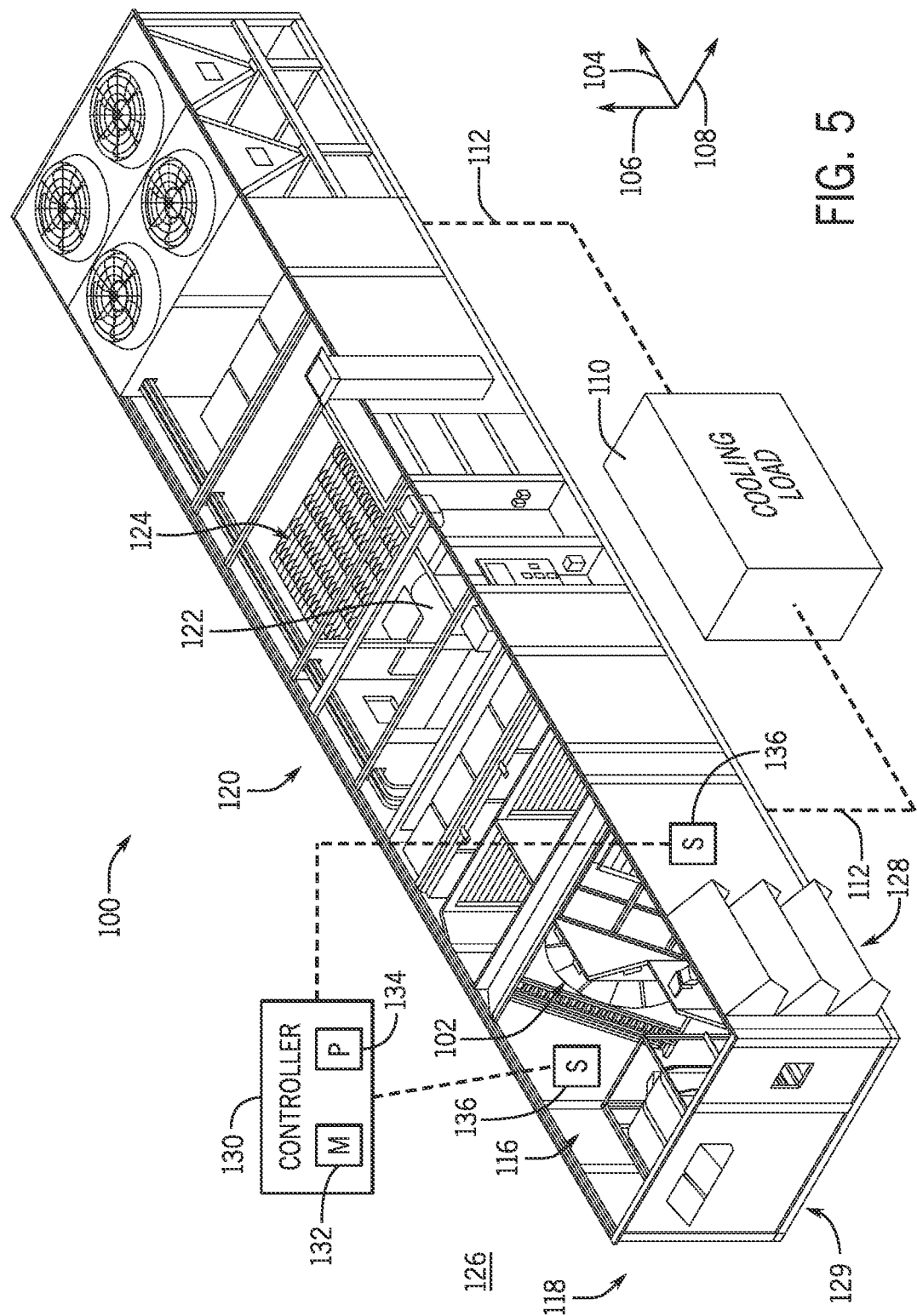
FIG. 5 is a perspective view of an embodiment of an HVAC system having an energy recovery wheel assembly, in accordance with an aspect of the present disclosure.

With the foregoing in mind, FIG. 5 is a perspective view of an embodiment of a heating, ventilation, and/or air conditioning (HVAC) system 100 having an energy recovery wheel assembly 102. It should be noted that the HVAC system 100 may include embodiments or components of the HVAC unit 12 shown in FIG. 1, embodiments or components of the residential heating and cooling system 50 shown in FIG. 3, a rooftop unit (RTU), or any other suitable HVAC system. To facilitate discussion, the HVAC system 100, the energy recovery wheel assembly 102, and their respective components, will be described with reference to a longitudinal axis 104, a vertical axis 106, which is oriented relative to gravity, and a lateral axis 108.

The HVAC system 100 may be configured to circulate a flow of conditioned air through a cooling load 110, such as a conditioned space within a building, residential home, or any other suitable structure. The cooling load 110 is in fluid communication with the HVAC system 100 via an air distribution system 112, represented by dashed lines, that includes ductwork configured to facilitate the supply and extraction of air from one or more rooms or spaces of the cooling load 110. The HVAC system 100 may also include a vapor compression system, such as the vapor compression system 72, which enables the HVAC system 100 to regulate one or more climate parameters within the cooling load 110. For example, the HVAC system 100 may be configured to maintain a desired air quality, air humidity, and/or air temperature within the cooling load 110.

As shown in the illustrated embodiment, the HVAC system 100 includes an intake/exhaust section 116, referred to herein as an air distribution plenum 116, which forms an end portion 118 of the HVAC system 100. The air distribution plenum 116 enables the HVAC system 100 to intake air, such as ambient air, to be conditioned and delivered to the cooling load 110 as supply air. For example, the illustrated HVAC system 100 includes a blower section 120 having one or more fans 122 configured to force the intake air through an evaporator section 124. The evaporator section 124 may place the intake air in a heat exchange relationship with cooled refrigerant, thereby cooling the intake air to generate the supply air. The HVAC system 100 may then deliver the cooled supply air to the cooling load 110, such as via the air distribution system 112. Moreover, the air distribution plenum 116 may draw return air from the cooling load 110 and discharge the return air into an ambient environment 126. As such, the air distribution plenum 116 enables the HVAC system 100 to circulate air into and out of the cooling load 110, thereby providing the cooling load 110 with conditioned air.

The HVAC system 100 may be configured to selectively operate in an economizer mode, which may be referred to as a full economizer mode, and in an energy recovery mode, as will be further explained below. In the full economizer mode, the HVAC system 100 may draw substantially all of the supply air from the ambient environment 126. In other words, in the full economizer mode, the supply air provided to the cooling load 110 may include outdoor air without return air. For example, the energy recovery wheel 102 is not operated in the full economizer mode, and the HVAC system 100 draws air from the ambient environment 126 via an economizer 128 of the HVAC system 100. Additionally, the air distribution plenum 116 may be operated to discharge substantially all return air received from the cooling load 110 through an exhaust section 129. In this way, substantially all of the supply air provided by the HVAC system 100 in the full economizer mode is the outdoor air drawn from the ambient environment 126. In the full economizer mode, the outdoor air may or may not be further conditioned by the HVAC system 100 before the outdoor air is output as the supply air.

In the energy recovery mode, the energy recovery wheel 102 may be rotated to place the return air in a heat exchange relationship with the outdoor air. Thus, the outdoor air may be pre-conditioned, such as pre-cooled, in the energy recovery mode. The HVAC system 100 may also include or be communicatively coupled to an automation controller 130. The automation controller 130 may adjust operation of the HVAC system 100 between the full economizer mode and the energy recovery mode. As used herein, the automation controller 130 may include any suitable control device, such as a programmable logic controller (PLC), having a memory 132 and a processor 134. The memory 132 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 100. The processor 134 may be configured to execute such instructions. For example, the processor 134 may include one or more application specific integrated circuits (ASICs), one or more field programmable gate arrays (FPGAs), one or more general purpose processors, or any combination thereof. As an example, the processor 134 may execute instructions stored on the memory 132 to set the operation of the HVAC system 100 in the full economizer mode or the energy recovery mode.

In certain embodiments, the automation controller 130 may be communicatively coupled to sensors 136 configured to determine one or more operating parameters related to HVAC system 100 operation. The automation controller 130 may operate the HVAC system 100 based on sensor feedback received from the sensors 136. By way of example, the sensors 136 may be configured to determine a temperature, a pressure, and/or another suitable operating parameter, of a fluid, such as an air flow or working fluid flow, and the automation controller 130 may operate the HVAC system 100 in the full economizer mode or the energy recovery mode based on the values of the operating parameters made by the sensors 136.

Figure 6:
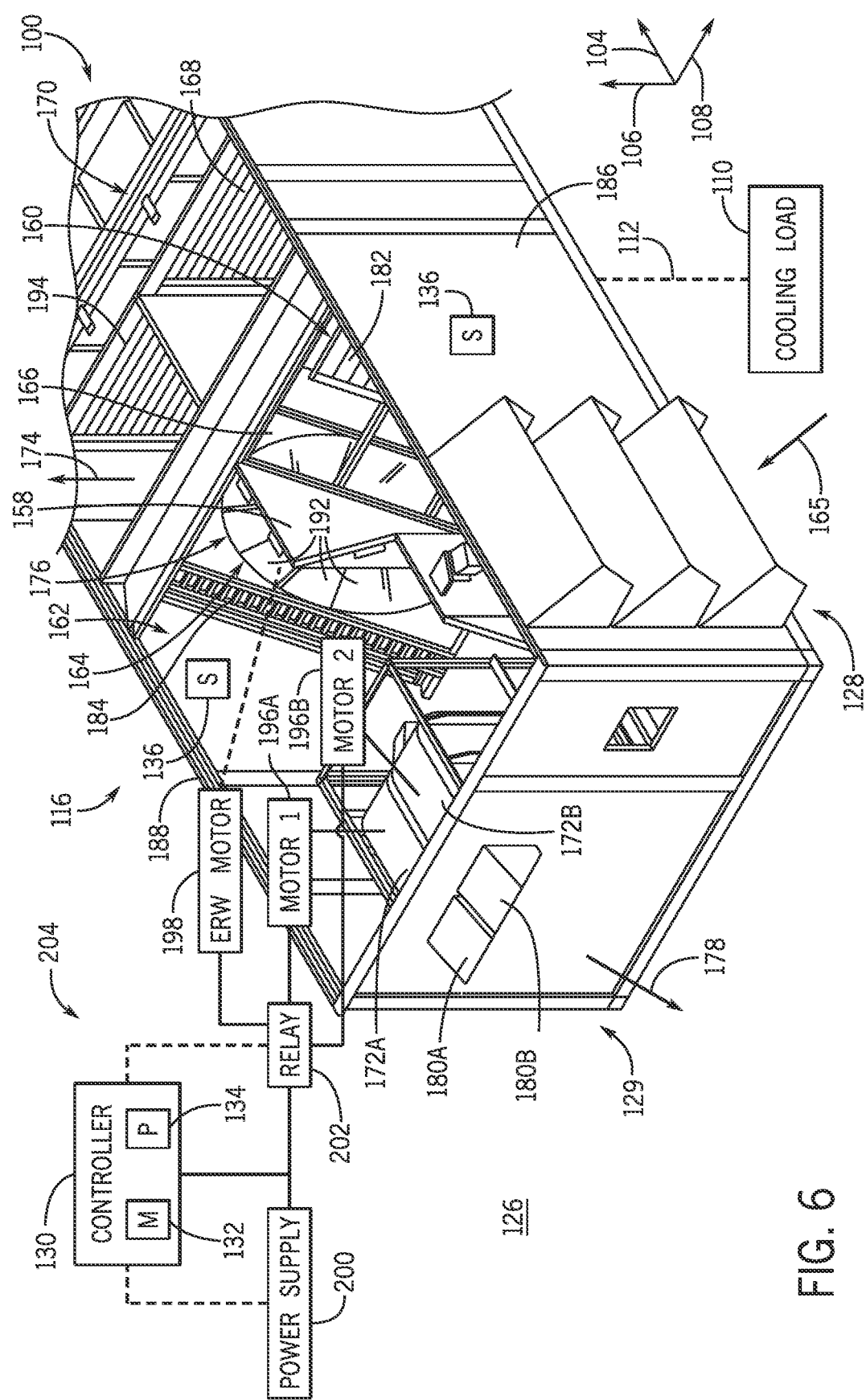
FIG. 6 is an expanded perspective view of an embodiment of an air distribution plenum of an HVAC system, in accordance with an aspect of the present disclosure.

FIG. 6 is an expanded perspective view of an embodiment of the air distribution plenum 116 of the HVAC system 100. As shown in the illustrated embodiment, the air distribution plenum 116 includes a partition 158 that extends generally along the vertical axis 106. The partition 158 may divide an interior of the air distribution plenum 116 between an outdoor air enclosure or section 160 and a return air enclosure or section 162. Accordingly, the outdoor air enclosure 160 and the return air enclosure 162 may extend from the end portion 118 of the HVAC system 100 toward the energy recovery wheel assembly 102. Moreover, the energy recovery wheel assembly 102 may extend through an opening of the partition 158 along the lateral axis 108, thereby enabling an energy recovery wheel 164 of the energy recovery wheel assembly 102 to span across at least a portion of the outdoor air enclosure 160 and the return air enclosure 162.

The fans 122 of the blower section 120 may draw outdoor air from the ambient environment 126 into the outdoor air enclosure 160 of the air distribution plenum 116 in a first air flow direction 165 via the economizer 128. During operation of the energy recovery wheel 164, the outdoor air may be directed across a first portion 166 of the energy recovery wheel 164 positioned within the outdoor air enclosure 160. The outdoor air may then flow through an outdoor air damper 168 of the air distribution plenum 116 to enter a supply air plenum or section 170, which may be in fluid communication with the evaporator section 124, and toward a supply air outlet to be delivered to the cooling load 110.

Furthermore, the return air enclosure 162 may receive return air from the cooling load 110. For example, during operation of the energy recovery wheel 164, exhaust fans 172 of the exhaust section 129 may draw the return air from the cooling load 110 in a second air flow direction 174 and across a second portion 176 of the energy recovery wheel 164 positioned within the return air enclosure 162. The exhaust fans 172 may then discharge at least a portion of the return air out of the air distribution plenum 116 in a third air flow direction 178 via an exhaust vent 180 of the exhaust section 129. In this way, the portion of the return air is discharged into the ambient environment 126 as exhaust air. It should be noted that, because the energy recovery wheel 164 may rotate during operation of the HVAC system 100, a particular section or segment of the energy recovery wheel 164 may continuously rotate into and out of the outdoor air enclosure 160 and the return air enclosure 162. Accordingly, as used herein, the first portion 166 of the energy recovery wheel 164 refers to the portion of the energy recovery wheel 164 that is disposed within the outdoor air flow section 160 at a particular instance in time, while the second portion 176 of the energy recovery wheel 164 refers to the portion of the energy recovery wheel 164 that is disposed within the return air enclosure 162 at that same instance in time. In other words, particular sections of the energy recovery wheel 164 corresponding to the first portion 166 and the second portion 176 may be transient while the energy recovery wheel 164 rotates.

In the illustrated embodiment, the energy recovery wheel assembly 102 further includes an outdoor air bypass damper 182 and a return air bypass damper 184 that are disposed within the HVAC system 100 and on opposing sides of the energy recovery wheel 164. Specifically, the outdoor air bypass damper 182 may extend between the energy recovery wheel 164 and a first side panel 186 of the air distribution plenum 116, while the return air bypass damper 184 extends between the energy recovery wheel 164 and a second side panel 188 of the air distribution plenum 116. Accordingly, the outdoor air bypass damper 182 and the return air bypass damper 184 are disposed within the outdoor air enclosure 160 and the return air flow enclosure 162, respectively. The outdoor air bypass damper 182 may enable the outdoor air to bypass the energy recovery wheel 164 in the outdoor air enclosure 160, and the return air bypass damper 184 may enable the return air to bypass the energy recovery wheel 164 in the return air flow enclosure 162. As an example, during the full economizer mode of the HVAC system 100, the energy recovery wheel 164 may be inactive or non-operational. Thus, the outdoor air flows from the ambient environment 126 to the supply air plenum 170 via the outdoor air bypass damper 182, and the return air flows from the cooling load 110 to the ambient environment 126 via the return air bypass damper 184. In other words, when the outdoor air bypass damper 182 and the return air bypass damper 184 are open during non-operation of the energy recovery wheel 164, air may flow through the dampers 182, 184 instead of through the energy recovery wheel 164, thereby avoiding fluidic resistance imparted by the stationary energy recovery wheel 164.

In circumstances in which the temperature between the outdoor air and the return air is substantially the same, such as a temperature differential less than 5 degrees Celsius, less than 10 degrees Celsius, less than 15 degrees Celsius, and so forth, the HVAC system 100 may operate in the full economizer mode. In an example, the automation controller 130 may receive sensor feedback from the sensors 136 indicating that a temperature differential between the outdoor air enclosure 160 and the return air enclosure 162 is below a threshold value, and the automation controller 130 may operate the HVAC system 100 in the full economizer mode based on the sensor feedback. In the full economizer mode, when the energy recovery wheel 164 is not in operation, the outdoor air may enter the supply air plenum 170, and the return air may be discharged from the air distribution plenum 116, without exchanging heat with one another. As such, substantially all of the outdoor air is directed to the supply air plenum 170 as supply air, substantially all of the return air is discharged via the exhaust vent 180, and the temperature of the outdoor air is not substantially affected by the temperature of the return air in the full economizer mode.

In circumstances in which a larger temperature differential exists between the outdoor air and the return air, such as a temperature differential greater than 10 degrees Celsius, greater than 15 degrees Celsius, greater than 20 degrees Celsius, and so forth, the HVAC system 100 may operate in the energy recovery mode. For instance, the automation controller 130 may receive sensor feedback from the sensors 136 indicating there is a temperature difference between the outdoor air enclosure 160 and the return air enclosure 162 that is greater than a threshold value, and the automation controller 130 may operate the HVAC system 100 in the energy recovery mode based on the sensor feedback. In the energy recovery mode, the energy recovery wheel 164 may be operable to recover thermal energy from the return air before the return air is discharged from the air distribution plenum 116. For example, the energy recovery wheel 164 may include heat transfer elements 192, such as a matrix material, a porous material, or any other suitable heat and/or moisture absorbing material, which facilitates the transfer of thermal energy from the outdoor air to the return air, or vice versa.

For instance, in embodiments in which the HVAC system 100 is operating in a cooling mode, a temperature of outdoor air entering the air distribution plenum 116 may be relatively high, while a temperature of the return air from the cooling load 110 may be relatively low. The return air may flow across the second portion 176 of the energy recovery wheel 164 and may absorb thermal energy from the second portion 176 of the energy recovery wheel 164, thereby reducing a temperature of the heat transfer elements 192 of the second portion 176 of the energy recovery wheel 164. Upon traversing the second portion 176 of the energy recovery wheel 164, the return air may be discharged from the air distribution plenum 116 via the exhaust vent 180. As the energy recovery wheel 164 rotates, the cooled heat transfer elements 192 situated within the return air enclosure 162 may transition into the outdoor air enclosure 160. The cooled heat transfer elements 192 entering the outdoor air enclosure 160 may then absorb thermal energy from the outdoor air flowing across the first portion 166 of the energy recovery wheel 164. As such, the energy recovery wheel 164 may cool or pre-condition the outdoor air by absorbing thermal energy from the outdoor air. It should be noted that the energy recovery wheel 164 may alternatively be used to transfer energy from the return air to the outdoor air, for example, in embodiments in which the HVAC system is operating in a heating mode, rather than a cooling mode.

In some cases, a portion of the return air drawn from the cooling load 110 may be recirculated to the cooling load 110 as supply air. For example, the HVAC system 100 may include a recovery damper 194 that is operable to enable a portion of the return air to enter the supply air plenum 170 as recovery air. The recovery air may mix with the outdoor air drawn into the supply air plenum 170 via the economizer 128 to form the supply air that the fans 122 direct toward the evaporator section 124. By way of example, during the cooling mode in which the temperature of the outdoor air is relatively high and the temperature of the recovery air is relatively low, the mixture of the recovery air with the outdoor air may produce supply air that is lower in temperature relative to the outdoor air alone. As such, the recovery air may further pre-cool or pre-condition the total supply air, and the amount that the recovery air pre-cools the total supply air may be based on a flow rate of the recovery air relative to a flow rate of the outdoor air into the HVAC system 100. It should also be noted that the recovery air may alternatively be used to pre-heat the total supply air, for example, in embodiments in which the HVAC system 100 is operating in a heating mode. The recovery damper 194 may be configured to regulate a flow rate of recovery air recirculating back to the cooling load 110 by transitioning between an open position, a closed position, or any position therebetween.

In certain embodiments, the exhaust section 129 includes two exhaust fans 172. The exhaust fans 172 may be positioned in a parallel arrangement, such as side by side, and each exhaust fan 172 may be rotated by a separate exhaust fan motor 196. That is, a first exhaust fan motor 196A may be configured to rotate a first exhaust fan 172A, and a second exhaust fan motor 196B may be configured to rotate a second exhaust fan 172B. Furthermore, an energy recovery wheel motor 198 may be configured to rotate the energy recovery wheel 164. In the full economizer mode, each of the exhaust fan motors 196 may be in operation to operate both of the exhaust fans 172. That is, each of the exhaust fans 172 may draw return air from the cooling load 110 and discharge the return air to the ambient environment 126. Furthermore, the recovery damper 194 may be substantially closed in the full economizer mode. Thus, substantially all of the return air drawn from the cooling load 110 is discharged to the ambient environment 126 via the exhaust fans 172 operating in parallel.

In some embodiments, each exhaust fan 172 may be of the same specification, design, model, and/or configuration, such as having the same size, operating at the same rotational speed, and the like. As such, each exhaust fan 172 may discharge the return air at approximately the same flow rate. In alternative embodiments, the exhaust fans 172 may be of different specifications and may discharge the return air at different flow rates. In any case, the specifications of the exhaust fans 172 may be selected to discharge the return air to the ambient environment at a desirable flow rate and to direct the return air through the exhaust fans 172 at respective velocities that avoid a stall condition. Additionally, in the full economizer mode, the energy recovery wheel motor 198 may not be in operation to operate the energy recovery wheel 164. For this reason, the outdoor air may flow through the outdoor air bypass damper 182, the return air may flow through the return air bypass damper 184, and heat transfer between the outdoor air and the return air may be limited.

In the energy recovery mode, the energy recovery wheel motor 198 may be in operation to rotate the energy recovery wheel 164, one of the exhaust fan motors 196 may be in operation to rotate one of the exhaust fans 172, and the other of the exhaust fan motors 196 may not be in operation such that the other of the exhaust fans 172 does not rotate. For instance, in the energy recovery mode, the second exhaust fan motor 196B is not in operation, and as a result, the second exhaust fan 172B is not in operation. Furthermore, the recovery damper 194 may open in the energy recovery mode to enable a first portion of the return air from the cooling load 110 to flow to the supply air plenum 170. A second, remaining portion of the return air from the cooling load 110 may flow through the second portion 176 of the energy recovery wheel 164. With the first exhaust fan 172A in operation and the second exhaust fan 172B not in operation, substantially all of the second portion of the return air is discharged through the exhaust vent 180 by the first exhaust fan 172A. In this case, a specification of the first exhaust fan 172A may be selected to discharge the second portion of the return air to the ambient environment at a desirable velocity to avoid a stall condition. For example, a size, operating speed, or other parameter of the first exhaust fan 172A may be selected based on an expected or target amount of the second portion of the return air, such that the first exhaust fan 172A discharges the second portion at a desired velocity and/or desired static pressure.

In addition, during the energy recovery mode of operation, the outdoor air may flow through the first portion 166 of the energy recovery wheel 164, which enables heat to exchange between the outdoor air and the second portion of the return air. After exchanging heat with the second portion of the return air, the outdoor air may flow through the outdoor air damper 168 into the supply air plenum 170 and combine with the first portion of the return air. In some embodiments, the amount at which the recovery damper 194 is open may be based on a target amount of the first portion of the return air relative to the second portion of the return air. For example, the recovery damper 194 may open such that the first portion of return air includes 35% of the total return air received by the HVAC system 100 and the second portion of return air includes 65% of the total return air received by the HVAC system 100. In other embodiments, the recovery damper 194 may be positioned such that the first portion includes 50% of the total return air and the second portion includes 50% of the total return air, or such that the first portion and the second portion include any other suitable target amounts of the total return air. Such percentages of the first portion relative to the second portion may be based on the particular HVAC system 100, a particular operation of the energy recovery mode, feedback received from the sensors 136, or another suitable parameter.

Although two exhaust fans 172 are shown in the illustrated embodiment, there may be any suitable number of exhaust fans 172 implemented in the air distribution plenum 116 to discharge return air into the ambient environment 126 at different total volumes based on an operating mode of the HVAC system 100 and/or based on a number of the exhaust fans 172 in operation. By way of example, three exhaust fans 172, four exhaust fans 172, five or more exhaust fans 172, or any other number of exhaust fans 172 may be used. Each exhaust fan 172 may be independently rotated by a respective motor 196, and a different number of exhaust fans 172 may be in operation in the full economizer mode than in the energy recovery mode. For instance, in the full economizer mode, a set of the exhaust fans 172, such as all of the exhaust fans 172, may be in operation, and in the energy recovery mode, a subset of the exhaust fans 172 may be in operation, such as half of the total number of exhaust fans 172. Alternatively, any suitable number of exhaust fans 172 may be in operation in the full economizer mode and in the energy recovery mode to enable the exhaust fans 172 to operate and avoid the stall condition.

In the illustrated embodiment, the automation controller 130 is communicatively coupled to a power supply 200 and to a relay 202. The relay 202 may be electrically coupled to the power supply 200, the exhaust fan motors 196, and the energy recovery wheel motor 198. The automation controller 130 may transmit a control signal to the power supply 200 to output power, and the relay 202 may enable the power provided by the power supply 200 to be delivered to the exhaust fan motors 196 and/or to the energy recovery wheel motor 198, thereby enabling the exhaust fans 172 and/or the energy recovery wheel 164 to operate. In some embodiments, the relay 202 may receive control signals from the automation controller 130. Based on the control signals, the relay 202 may selectively enable power to be provided to certain components of the HVAC system 100, thereby setting the operating mode of the HVAC system 100. As such, the automation controller 130, the relay 202, and the power source 200 may be a part of a controller or control system 204 configured to adjust the operation of the HVAC system 100. For example, the automation controller 130 may transmit control signals indicative of operation of the HVAC system 100 in the full economizer mode, and the relay 202 may enable power to be provided to both exhaust fans 172, but not to the energy recovery wheel 164. Alternatively, the automation controller 130 may transmit control signals indicative of HVAC system 100 operation of the HVAC system 100 in the energy recovery mode, and the relay 202 may enable power to be provided to one of the exhaust fans 172 and to the energy recovery wheel motor 198.

Figure 7:
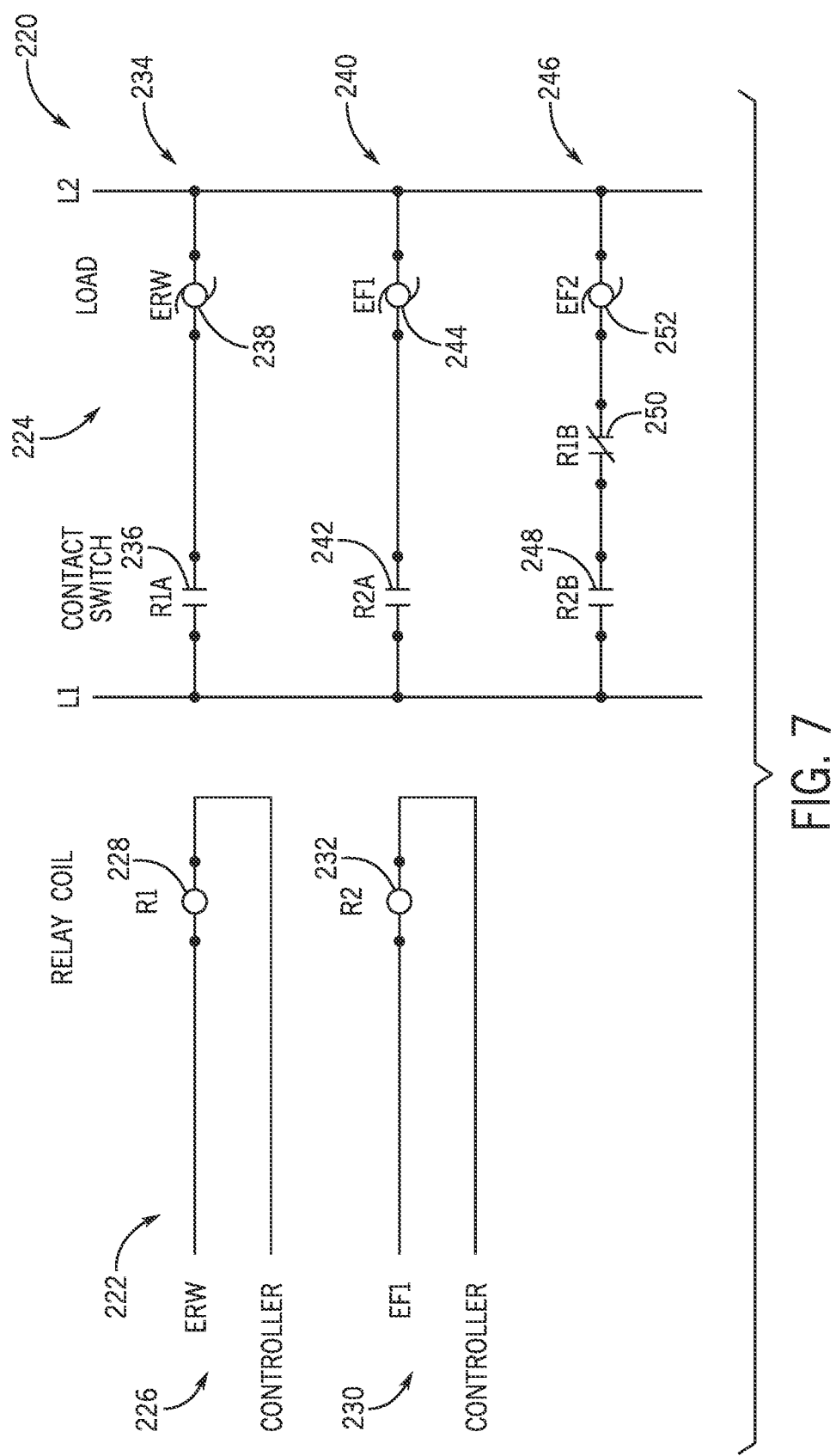
FIG. 7 is a schematic of an embodiment of relay logic that may be employed by a relay of an HVAC system to power components of the HVAC system based on control signals received from an automation controller, in accordance with an aspect of the present disclosure.

FIG. 7 is a schematic of an embodiment of relay logic 220 that may be employed by the relay 202 to control a supply of power to HVAC system 100 components based on control signals received from the automation controller 130. The relay logic 220 may enable power or a voltage to be supplied from the power supply 200 to the exhaust fan motors 196 and/or to the energy recovery wheel motor 198. The relay logic 220 includes a controller network 222 and an electrical network 224. The controller network 222 illustrates various interactions between the automation controller 130 and the relay 202. For example, at a first control line 226, the automation controller 130 may be configured to transmit a first control signal, which may be an energy recovery wheel activation signal, to a first relay coil 228, which may be an energy recovery wheel activation coil. At a second control line 230, the automation controller 130 may be configured to transmit a second control signal, which may be an exhaust fan activation signal, to a second relay coil 232, which may be an exhaust fan activation coil.

The electrical network 224 illustrates various interactions between the power source 200 and the relay 202. The configuration of the electrical network 224 may be based on the interaction between the automation controller 130 and the relay 202. For example, a first line 234 of the electrical network 224 may include a first contact switch 236 electrically coupled to a first load 238, which may be an energy recovery wheel load. A second line 240 of the electrical network 224 may include a second contact switch 242 electrically coupled to a second load 244, which may be a first exhaust fan load. A third line 246 of the electrical network 224 may include a third contact switch 248 and a fourth contact switch 250 electrically coupled to a third load 252, which may be a second exhaust fan load. The loads 238, 244, 252 may be electrically coupled to the energy recovery wheel motor 198, the first exhaust fan motor 196A, and the second exhaust fan motor 196B, respectively. In some embodiments, the loads 238, 244, 252 may be motor starters configured to activate the energy recovery wheel motor 198, the first exhaust motor 196A, and the second exhaust motor 196B, respectively, to operate the energy recovery wheel 164, the first exhaust fan 172A, and the second exhaust fan 172B, respectively. Generally, each of the contact switches 236, 242, 248, 250 may adjust between an open position, which interrupts power supply to a respective load 238, 244, 252, and a closed position, which enables power supply to a respective load 238, 244, 252. Thus, the first load 238 may enable operation of the energy recovery wheel motor 198 upon receiving power, the second load 244 may enable operation of the first exhaust motor 196A upon receiving power, and the third load 252 may enable operation of the second exhaust motor 196B upon receiving power. The position of the contact switches 236, 242, 248, 250 may be based on control signals sent by the automation controller 130 to the respective relay coils 228, 232. Thus, the control signals sent by the automation controller 130 are used to control operation of the exhaust fans 172 and the energy recovery wheel 164.

For example, in the full economizer mode, the automation controller 130 does not transmit the first control signal to the first relay coil 228 to operate the energy recovery wheel 164. The first relay coil 228 may be electrically coupled to the first contact switch 236, which may be a normally open contact switch, of the first line 234. That is, the first contact switch 236 may be in the open position when not actuated by the first relay coil 228, and the first contact switch 236 may be in the closed position when actuated by the first relay coil 228. In the full economizer mode, the first relay coil 228 does not receive the first control signal and, as a result, does not actuate the first contact switch 236. Therefore, the first contact switch 236 remains in the open position, thereby interrupting a supply of power to the first load 238, such that the energy recovery wheel motor 198 and the energy recovery wheel 164 are not in operation in the full economizer mode. Furthermore, in the full economizer mode, the automation controller 130 may transmit the second control signal to the second relay coil 232 to operate the first exhaust fan 172A. The second relay coil 232 may be electrically coupled to the second control switch 242, which may be another normally open control switch, of the second line 240. In response to receiving the second control signal, the second relay coil 232 may actuate the second control switch 242 to move the second control switch 242 to the closed position. The closed position of the second control switch 242 enables power to be provided to the second load 244, thereby operating the first exhaust fan motor 196A and the first exhaust fan 172A in the full economizer mode.

Additionally, the first relay coil 228 may be electrically coupled to the fourth contact switch 250 of the third line 246, and the second relay coil 232 may be electrically coupled to the third control switch 248 of the third line 246. The fourth contact switch 250 may be a normally closed contact switch, which is a contact switch that is in the closed position when not actuated by the second relay coil 232, and the third contact switch 248 may be a normally open contact switch. In the full economizer mode, the first relay coil 228 does not receive the first control signal and does not actuate the fourth contact switch 250, thereby leaving the fourth contact switch 250 in the closed position. Furthermore, in the full economizer mode, the second relay coil 232 receives the second control signal and actuates the third contact switch 248. Thus, the third contact switch 248 is also in the closed position. Since both the third and fourth contact switches 248, 250 are in the closed position, power is supplied to the third load 252 to operate the second exhaust fan motor 196B. In this way, the second exhaust fan 172B is in operation in the full economizer mode.

In the energy recovery mode, the automation controller 130 may transmit the first control signal to the first relay coil 228. As a result, the first relay coil 228 may actuate the first contact switch 236 to set the first contact switch 236 in the closed position, thereby enabling power to be supplied to the first load 238 to operate the energy recovery wheel motor 198 in the energy recovery mode. Further, the automation controller 130 transmits the second signal to the second relay coil 242. Therefore, the second relay coil 232 actuates the second contact switch 242 to set the second contact switch 242 in the closed position, thereby enabling power to be supplied to the second load 244 to operate the first exhaust fan motor 196B in the energy recovery mode. Additionally, since the automation controller 130 transmits the first control signal to the first relay coil 228 in the energy recovery mode, the first relay coil 228 also actuates the fourth contact switch 250 to set the fourth contact switch 250 in the open position. In this way, supply of power to the third load 252 is interrupted, and the second exhaust fan motor 196B is not in operation in the energy recovery mode. In other words, even though the second relay coil 232 may receive the second control signal to actuate the third contact switch 248 and set the third contact switch 248 in the closed position, the open position of the fourth contact switch 250 interrupts the supply of power to the third load 252, such that the third load 252 does not operate the second exhaust fan motor 196B. Thus, the second exhaust fan 172B is not in operation in the energy recovery mode.

Figure 8:
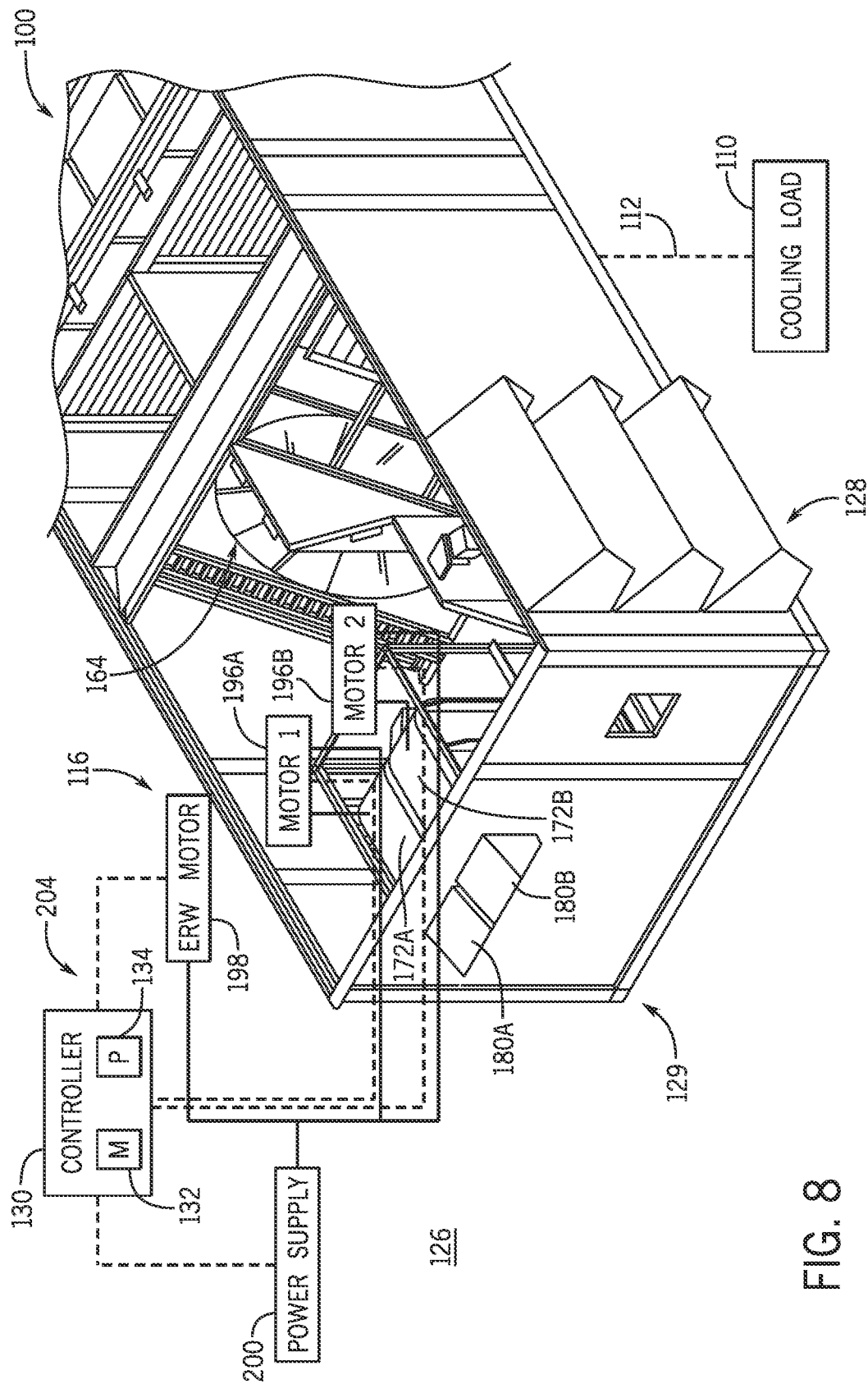
FIG. 8 is an expanded view of an embodiment of an air distribution plenum of an HVAC system, in accordance with an aspect of the present disclosure.

FIG. 8 is an expanded view of another embodiment of the air distribution plenum 116 of the HVAC system 100. In the illustrated embodiment, the controller 204 does not include the relay 202. Rather, the automation controller 130 may be in direct communication with the energy recovery wheel 164 and the exhaust fans 172. For example, the automation controller 130 may be configured to transmit respective controls signals to the energy recovery wheel motor 198 and the exhaust fan motors 196 to control the operation of the energy recovery wheel 164 and the exhaust fans 172. By way of example, in the full economizer mode, the automation controller 130 may transmit a first control signal to the first exhaust fan motor 196A to receive power from the power supply 200 and operate the first exhaust fan 172A. Moreover, the automation controller 130 may transmit a second control signal to the second exhaust fan motor 196B to receive power from the power supply 200 and operate the second exhaust fan 172B. In additional or alternative embodiments, the automation controller 130 may transmit control signals to the power supply 200 to instruct the power supply 200 to output power to the exhaust fan motors 196 to operate the exhaust fans 172. Further, the automation controller 130 may not transmit a third control signal to the energy recovery wheel motor 198 and, as a result, the energy recovery wheel 164 is not in operation in the full economizer mode. In the energy recovery mode, the automation controller 130 may transmit the first control signal to the first exhaust fan motor 196A to operate the first exhaust fan 172A. The automation controller 130 may transmit the third control signal to the energy recovery wheel motor 198 to operate the energy recovery wheel 164. However, the automation controller 130 may not transmit the second control signal to the second exhaust fan motor 196B. Thus, the second exhaust fan 172B is not in operation in the energy recovery mode. As similarly mentioned above, the automation controller 130 may be configured to send or not send appropriate control signals to the power supply 200 in order to provide or not provide power to the components discussed above based on an operating mode of the HVAC system 100.

It should be noted that the features described herein may retrofit into existing HVAC systems. For example, existing HVAC systems may be modified to include multiple exhaust fans. The relay 202 may further be installed to such HVAC systems to configure the operation of the exhaust fans in accordance with the full economizer mode and in the energy recovery mode described above. Additionally or alternatively, a respective controller, such as the automation controller 130, of the HVAC systems may be programmed to configure the operation and/or non-operation of the exhaust fans in the full economizer mode and in the energy recovery mode. In either case, an existing HVAC system may be modified to change the number of exhaust fans included in the existing HVAC system and in operation between the full economizer mode and the energy recovery mode to enable adequate discharge of return air and desirable performance of the HVAC system.

Figure 9:
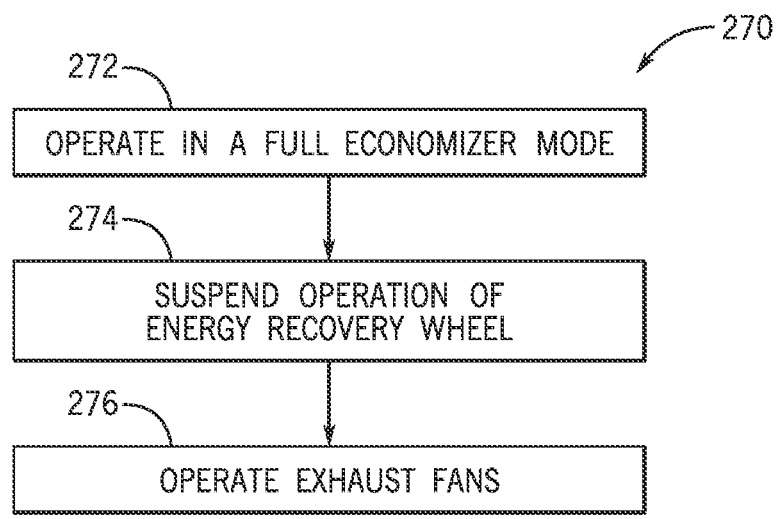
FIG. 9 is a block diagram of a method or process for operating an HVAC system in a full economizer mode, in accordance with an aspect of the present disclosure.
Figure 10:
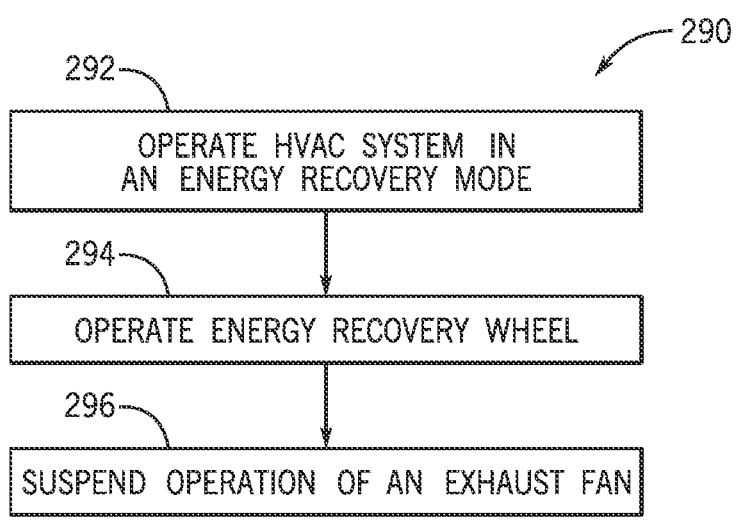
FIG. 10 is a block diagram of a method of process for operating an HVAC system in an energy recovery mode, in accordance with an aspect of the present disclosure.

FIGS. 9 and 10 each illustrate a method or process for operating the HVAC system 100, in accordance with the techniques described herein. Each method may be performed by a control system, such as the controller 204. It should be noted that each method may be modified and/or performed differently, such as for different embodiments of the HVAC system 100. As an example, additional steps may be performed for any of the methods. Additionally or alternatively, certain steps of each method may be modified, removed, or performed in a different order than depicted in FIGS. 9 and 10.

FIG. 9 is a block diagram of a method or process 270 for operating the HVAC system 100 in the full economizer mode. At block 272, the controller 204 sets the operation of the HVAC system 100 in the full economizer mode. For example, the controller 204 may determine the temperature differential between the outdoor air and the return air is substantially zero or negligible based on received sensor feedback, such as below a threshold value, and the controller 204 may set the operation of the HVAC system 100 in the full economizer mode in response. Additionally or alternatively, the controller 204 may receive a user input from a user indicative of a request to operate in the full economizer mode, and the controller 204 sets the operation of the HVAC system 100 based on the user input.

At block 274, the controller 204 suspends operation of the energy recovery wheel 164. In some implementations, the relay 202 of the controller 204 interrupts the supply of power to the energy recovery wheel motor 198, and the energy recovery wheel 164 is not in operation as a result. For instance, the relay 202 does not receive an activation signal from the automation controller 130 to operate the energy recovery wheel 164 and, in response, the relay 202 does not enable power to be supplied to the energy recover wheel motor 198. In additional or alternative implementations, the automation controller 130 is in direct communication with the energy recovery wheel motor 198, the automation controller 130 does not transmit a control signal to the energy recovery wheel motor 198, and the energy recovery wheel 164 is not in operation.

At block 276, the controller 204 operates the exhaust fans 172. In embodiments of the controller 204 having the relay 202, the relay 202 enables power to be supplied to the exhaust fan motors 196 to operate the exhaust fans 172. By way of example, the relay 202 receives an activation signal from the automation controller 130 to operate the first exhaust fan motor 196A, and the relay 202 enables power to be supplied to the first exhaust fan motor 196A to operate the first exhaust fan 172A. As a result, the relay 202 may enable power to be supplied to the second exhaust fan motor 196B based on receiving the activation signal to operate the first exhaust fan motor 196A and also based on not receiving the activation signal to operate the energy recovery wheel motor 198. Thus, the second exhaust fan 172B is also in operation. Additionally or alternatively, the automation controller 130 may directly transmit respective control signals to the exhaust fan motors 196 to operate the exhaust fans 172. In any case, the multiple exhaust fans 172 are in operation, and the energy recovery wheel 164 is not in operation in the full economizer mode.

FIG. 10 is a block diagram of a method of process 290 for operating the HVAC system 100 in the energy recovery mode. At block 292, the controller 204 sets the operation of the HVAC system 100 in the energy recovery mode. For instance, the controller 204 may determine there is a larger or significant temperature differential between the outdoor air and the return air based on received sensor feedback, such as a temperature differential above a threshold value. For this reason, the controller 204 may set the operation of the HVAC system 100 in the energy recovery mode. Additionally or alternatively, the controller 204 may receive user input indicative of a request to operate in the energy recovery mode, and the controller 204 sets the operation of the HVAC system 100 in response.

At block 294, the controller 204 operates the energy recovery wheel 164. In one example, the automation controller 130 transmits an activation signal to the relay 202 to operate the energy recovery wheel 164, and the relay 202 enables power to be supplied to the energy recovery wheel motor 198 in response, thereby operating the energy recovery wheel 164. In another example, the automation controller 130 directly transmits a control signal to the energy recovery wheel motor 198 to operate the energy recovery wheel 164.

At block 296, the controller 204 suspends operation of one of the exhaust fans 172, such as the second exhaust fan 172B. In certain embodiments, the relay 202 receives an activation signal to operate the first exhaust fan 172A in addition to receiving the activation signal to operate the energy recovery wheel 164. As a result of receiving both of the activation signals, the relay 202 may interrupt a supply of power to the second exhaust fan 196B. Additionally or alternatively, the automation controller 130 may be in direct communication with the second exhaust fan motor 196B. In such embodiments, the automation controller 130 may not transmit a control signal to the second exhaust fan motor 196B. As such, in the energy recovery mode, the energy recovery wheel 164 and the first exhaust fan 172A are in operation, and the second exhaust fan 172B is not in operation.

Embodiments of the present disclosure are directed to a heating, ventilation, and/or air conditioning (HVAC) system configured to operate in a full economizer mode and in an energy recovery mode. In the full economizer mode, the HVAC system may draw return air from a conditioned space, and a first and a second exhaust fan may be in operation to discharge substantially all of the return air to an ambient environment. Moreover, the HVAC system may draw outdoor air from the ambient environment to supply the outdoor air as the supply air delivered to the conditioned space. In the full economizer mode, the HVAC system may not further condition the outdoor air that is supplied to the conditioned space as supply air, thereby reducing power consumption of the HVAC system.

In the energy recovery mode, the HVAC system may continue to draw outdoor air from the ambient environment. In addition, the HVAC system may draw the return air from the conditioned space, and a first portion of the drawn return air may be directed to mix with the outdoor air. The mixture of return air and outdoor air may be conditioned as supply air to be delivered to the conditioned space. The second portion of the return air may be drawn across an energy recovery wheel configured to place the second portion of the return air in a heat exchange relationship with the outdoor air. As a result, the second portion of the return air may pre-condition the outdoor air in the energy recovery mode, thereby increasing an efficiency of conditioning the supply air. Further, the second portion of the return air may be discharged to the ambient environment by operation of one of the exhaust fans, while the operation of the other exhaust fan may be suspended. As such, substantially all of the second portion of the return air may flow across one of the exhaust fans. Operating two exhaust fans in the full economizer mode and operating one exhaust fan in the energy recovery mode may improve a performance of the HVAC system. For example, the HVAC system discharges different amounts of the return air at adequate flow rates in the different modes, and the exhaust fans avoid operating in a stall condition in both the full economizer mode and the energy recovery mode. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) unit, comprising:
   a first fan and a second fan configured to discharge return air from the HVAC unit in parallel;
   an energy recovery wheel configured to transfer heat between outdoor air received by the HVAC unit and the return air; and
   a controller configured to:
      operate the first fan and the second fan in a first mode of the HVAC unit; and
      operate the first fan, operate the energy recovery wheel, and suspend operation of the second fan in a second mode of the HVAC unit.

2. The HVAC unit of claim 1, wherein the controller is configured to suspend operation of the energy recovery wheel in the first mode of the HVAC unit.

3. The HVAC unit of claim 1, comprising an energy recovery wheel assembly that comprises the energy recovery wheel and a return air damper configured to direct the return air to bypass the energy recovery wheel in the first mode.

4. The HVAC unit of claim 3, wherein the energy recovery wheel assembly comprises an outdoor air damper configured to direct the outdoor air to bypass the energy recovery wheel in the first mode.

5. The HVAC unit of claim 1, wherein the controller is configured to selectively operate the HVAC unit in the first mode and in the second mode based on feedback from one or more sensors, wherein the feedback is indicative of a temperature of the return air, a temperature of the outdoor air, or both.

6. The HVAC unit of claim 1, wherein the first fan is configured to draw a first flow of return air across the energy recovery wheel, and the second fan is configured to draw a second flow of return air across the energy recovery wheel.

7. A heating, ventilation, and/or air conditioning (HVAC) system, comprising:
   a housing;
   a plurality of fans configured to discharge return air from the housing;
   an energy recovery wheel disposed within the housing, wherein the energy recovery wheel is configured to transfer heat between ambient air received by the housing and the return air; and
   a controller configured to operate the energy recovery wheel and suspend operation of a fan of the plurality of fans in an operating mode of the HVAC system.

8. The HVAC system of claim 7, wherein the plurality of fans is configured to discharge the return air from the housing in parallel with one another.

9. The HVAC system of claim 7, wherein the operating mode is a first operating mode, and the controller is configured to suspend operation of the energy recovery wheel and operate each fan of the plurality of fans in a second operating mode of the HVAC system.

10. The HVAC system of claim 9, wherein the HVAC system comprises an energy recovery wheel assembly, and the energy recovery wheel assembly comprises the energy recovery wheel, a first damper configured to direct the ambient air to bypass the energy recovery wheel in the second operating mode, and a second damper configured to direct the return air to bypass the energy recovery wheel in the second operating mode.

11. The HVAC system of claim 7, wherein the HVAC system comprises:
an economizer configured to direct the ambient air into the housing; and
a partition disposed within the housing to define a first section and a second section within the housing,
wherein the plurality of fans is configured to discharge the return air from the first section, and the economizer is configured to direct the ambient air into the second section.

12. The HVAC system of claim 11, wherein the operating mode is a first operating mode, the controller is configured to suspend operation of the energy recovery wheel and operate each fan of the plurality of fans in a second operating mode of the HVAC system, and the economizer is configured to direct the ambient air into the second section in the first operating mode and in the second operating mode.

13. The HVAC system of claim 7, comprising a sensor communicatively coupled to the controller, wherein the controller is configured to operate the HVAC system in the operating mode based on data received from the sensor.

14. The HVAC system of claim 13, wherein the controller is configured to:
determine a temperature differential between the ambient air and the return air based on the data received from the sensor; and
operate the HVAC system in the operating mode in response to a determination that the temperature differential between the ambient air and the return air exceeds a threshold value.

15. The HVAC system of claim 7, wherein each fan of the plurality of fans is configured to draw the return air across the energy recovery wheel.

16. A tangible, non-transitory, computer-readable medium, comprising instructions stored thereon, wherein the instructions, when executed by one or more processors, are configured to cause the one or more processors to:
operate each fan of a plurality of fans to discharge return air from a heating, ventilation, and/or air conditioning (HVAC) unit in a first mode of the HVAC unit;
operate an energy recovery wheel in a second mode of the HVAC unit to transfer heat between ambient air and the return air; and
suspend operation of a fan of the plurality of fans in the second mode.

17. The tangible, non-transitory, computer-readable medium of claim 16, wherein the instructions, when executed by the one or more processors, are configured to cause the one or more processors to:
operate each fan of the plurality of fans in the first mode in response to a determination that a temperature differential between the return air and the ambient air is less than a threshold value; and
operate the energy recovery wheel and suspend the operation of the fan of the plurality of fans in the second mode in response to a determination that the temperature differential between the return air and the ambient air exceeds the threshold value.

18. The tangible, non-transitory, computer-readable medium of claim 16, wherein the instructions, when executed by the one or more processors, are configured to cause the one or more processors to suspend operation of the energy recovery wheel in the first mode.

19. The tangible, non-transitory, computer-readable medium of claim 16, wherein the instructions, when executed by the one or more processors, are configured to cause the one or more processors to:
output a first control signal to a relay to cause the relay to supply power to each fan of the plurality of fans in the first mode; and
output a second control signal to the relay to cause the relay to supply power to the energy recovery wheel and to interrupt supply of power to the fan of the plurality of fans in the second mode.

20. The tangible, non-transitory, computer-readable medium of claim 16, wherein the fan is a first fan, the plurality of fans comprises a second fan, and the instructions, when executed by the one or more processors, are configured to cause the one or more processors to operate a first motor of the first fan and operate a second motor of the second fan independently of one another.

* * * * *